US012795748B2

(12) United States Patent
Kabbinale et al.

(10) Patent No.: US 12,795,748 B2
(45) Date of Patent: Nov. 10, 2026

(54) METHOD AND SYSTEM FOR COLLISION AVOIDANCE IN ULTRA-WIDE BAND NETWORK

(71) Applicant: Samsung Electronics Co., Ltd., Gyeonggi-do (KR)

(72) Inventors: Aniruddh Rao Kabbinale, Bangalore (IN); Karthik Srinivasa Gopalan, Bangalore (IN); Ankur Bansal, Bangalore (IN)

(73) Assignee: Samsung Electronics Co., Ltd (KR)

( * ) Notice: Subject to any disclaimer, the term of this patent is extended or adjusted under 35 U.S.C. 154(b) by 212 days.

(21) Appl. No.: 18/690,916

(22) PCT Filed: Sep. 15, 2022

(86) PCT No.: PCT/KR2022/013817
§ 371 (c)(1),
(2) Date: Mar. 11, 2024

(87) PCT Pub. No.: WO2023/043236
PCT Pub. Date: Mar. 23, 2023

(65) Prior Publication Data

US 2024/0373478 A1 Nov. 7, 2024

(30) Foreign Application Priority Data

Sep. 15, 2021 (IN) ............................ 202141041721
Sep. 5, 2022 (IN) ............................ 202141041721

(51) Int. Cl.
*H04W 74/0833* (2024.01)
*H04B 1/7163* (2011.01)

(52) U.S. Cl.
CPC ........ *H04W 74/085* (2013.01); *H04B 1/7163* (2013.01)

(58) Field of Classification Search
None
See application file for complete search history.

(56) References Cited

U.S. PATENT DOCUMENTS

2003/0103521 A1 6/2003 Raphaeli et al.
2009/0053999 A1 2/2009 Shoemake et al.
(Continued)

FOREIGN PATENT DOCUMENTS

EP 1 667 367 6/2006
KR 10-2015-0058601 5/2015

OTHER PUBLICATIONS

PCT/ISA/210 Search Report dated Dec. 16, 2022 issued on PCT/KR2022/013817, pp. 4.
(Continued)

*Primary Examiner* — Nguyen H Ngo
(74) *Attorney, Agent, or Firm* — The Farrell Law Firm, P.C.

(57) ABSTRACT

Embodiments herein disclose a method and first electronic device for collision avoidance in an UWB network. The method further includes identifying in the UWB network, a slot in a mirroring channel for sending an advertisement packet and starting a Reservation Delay Timer (RDT) before reserving the identified slot in the mirroring channel. The method further includes determining whether at least one second electronic device in the UWB network is trying to reserve the identified slot in the mirroring channel while the RDT timer is running. The method further includes performing reserving the identified slot in the mirroring channel in response to determining that the at least one second electronic device is not trying to reserve the identified slot while the RDT timer is running, and sending the advertisement packet for the reservation at expiry of the RDT.

12 Claims, 12 Drawing Sheets

(56) References Cited

U.S. PATENT DOCUMENTS

| | | | | |
|---|---|---|---|---|
| 2009/0067389 | A1 | 3/2009 | Lee et al. | |
| 2010/0003929 | A1 | 1/2010 | Sohn et al. | |
| 2010/0177718 | A1 | 7/2010 | Harie et al. | |
| 2016/0338103 | A1* | 11/2016 | Martin | H04W 72/04 |
| 2018/0098355 | A1* | 4/2018 | Islam | H04W 24/08 |
| 2022/0295483 | A1* | 9/2022 | Jain | H04W 72/0446 |
| 2023/0037601 | A1* | 2/2023 | Lee | H04W 8/005 |

OTHER PUBLICATIONS

PCT/ISA/237 Written Opinion dated Dec. 16, 2022 issued on PCT/KR2022/013817, pp. 5.

Indian Office Action dated Sep. 11, 2023 issued in Indian Application No. 202141041721, pp. 5.

Mingyu Lee et al., "Narrowband / UWB Coupling MAC", Sep. 17, 2021, pp. 17.

* cited by examiner

METHOD AND SYSTEM FOR COLLISION AVOIDANCE IN ULTRA-WIDE BAND NETWORK

CROSS-REFERENCE TO RELATED APPLICATIONS

This application is a U.S. National Phase Entry of PCT International Application No. PCT/KR2022/013817, which was filed on Sep. 15, 2022, and claims priority to Indian patents application Nos. 202141041721 and 202141041721, which were filed on Sep. 15, 2021, and Sep. 5, 2022, respectively, the entire disclosure of each of which is incorporated herein by reference.

TECHNICAL FIELD

The embodiments herein relate to an electronic device. More particularly relates to a method and electronic device for collision avoidance in an ultra-wide band network. The present application is based on, and claims priority from an Indian Application Number 202141041721 filed on 15 Sep. 2021, the disclosure of which is hereby incorporated by reference herein.

BACKGROUND ART

Generally, in Ultra-wideband (UWB) network, the channel utilization is improved by managing collusions in discovery channel and mirroring channel. In the UWB network, the discovery channel is used to discover electronic device and connection setup, any electronic device transmits a discovery message or connection setup message at the discovery channel to discover devices or setup connection. Further, In the UWB network, the mirroring channel is used to mirror UWB channel occupancy, by listening the mirroring channel, other devices can recognize whether the corresponding UWB channel is occupied or not.

In conventional methods, when more than one electronic device transmits the discovery message or connection setup message at the same time in the discovery channel, collision may occurs in between discovery messages or in between connection setup messages. Further, when more than one electronic device reserves same UWB slot in the mirroring channel, collision may occur. The collision occurs in the mirroring channel and discovery channel leads to a loss of efficiency in channel usage of the UWB network.

Thus, it is desired to address the above mentioned disadvantages or other shortcomings or at least provide a useful alternative to improve channel utilization in ultra-wide band systems.

DISCLOSURE OF INVENTION

Technical Problem

The principal object of the embodiments herein is to provide a method a method for collision avoidance in a discovery channel and mirroring channel in an Ultra-Wide Band (UWB) network.

Another object of the embodiments herein is to start a Reservation Delay Timer (RDT) before reserving an identified slot in the mirroring channel and reserving the identified slot in the mirroring channel in response to determining that least one second electronic device is not trying to reserve the identified slot while the RDT timer is running.

Another object of the embodiments herein is to receive the advertisement packet in the mirroring channel from the at least one second electronic device and extract an advertisement information in the advertisement packet. Identify a schedule of transmission of the second electronic device from the advertisement information and transmit an advertisement packet based on the identified schedule of the second electronic device.

Another object of the embodiments herein is to the advertisement information contains information which are specific to the second electronic device to get responses from at least one relevant electronic device.

Another object of the embodiments herein is to get responses from at least one relevant electronic device by sending an advertisement information contains information which are specific to the second electronic device.

Solution to Problem

Accordingly, the embodiments herein disclose a method for collision avoidance in an Ultra-Wide Band (UWB) network. The method further includes identifying in the UWB network, a slot in a mirroring channel for sending an advertisement packet and starting a Reservation Delay Timer (RDT) before reserving the identified slot in the mirroring channel. The method further includes determining whether at least one second electronic device in the UWB network is trying to reserve the identified slot in the mirroring channel while the RDT timer is running. The method further includes performing reserving the identified slot in the mirroring channel in response to determining that the at least one second electronic device is not trying to reserve the identified slot while the RDT timer is running, and sending the advertisement packet for the reservation at expiry of the RDT or backing off from reserving the identified slot in the mirroring channel for collision avoidance in response to determining that the at least one second electronic device is trying to reserve the identified slot while the RDT timer is running.

In an embodiment, sending the advertisement packet at a beginning of a reservation window from next cycle of the reservation.

In an embodiment, initiating, by the first electronic device, the reservation window based on the identified slot and starting, by the first electronic device, the RDT at beginning of the reservation window.

In an embodiment, the RDT comprising of a value in between at least one of a minimum value of at least one Round Trip Time (RTT) and a maximum value of a difference between a window size of the reservation window and a time duration of the advertisement packet In an embodiment, receiving the advertisement packet in the mirroring channel from the at least one second electronic device and extracting an advertisement information in the advertisement packet. The method further includes identifying a schedule of transmission of the second electronic device from the advertisement information; and transmit advertisement packet based on the identified schedule of the second electronic device.

In an embodiment, adding an advertisement information in the advertisement packet, wherein advertisement information have a schedule of transmission of the first electronic device and sending the advertisement packet in the mirroring channel.

Accordingly, the embodiments herein disclose a method for collision avoidance in a discovery channel in an Ultra-Wide Band (UWB) network. The method further includes defining at least one of: Ranging Discovery Initial Delay (RDID) timer, Ranging Discovery Response Delay (RDRD) timer and Ranging Connection Setup Delay (RCSD) timer. The method further includes starting the at least one of the RDID timer, RDRD timer and RCSD timer and determining presence of collision in a discovery channel. The method further includes performing sending at least one of discovery beacon, connection request, connection confirmation and connection setup messages in the discovery channel if no collision is detected before the expiry of the timer or backing off from sending at least one of discovery beacon, connection request, connection confirmation and connection setup messages in the discovery channel in response to determining the presence of collision in the discovery channel.

In an embodiment, value of the RCSD timer is higher than the RDRD timer and lower than the RDID timer.

In an embodiment, determining presence of collision in a discovery channel. The method further includes performing backing off in linear in response to the detection of less collisions or backing off in exponential in response to the detection of more collisions.

In an embodiment, sending, by the first electronic device, the connection setup messages during a connection setup in the discovery channel in response to expiry of the RCSD timer; wherein next messages within connection setup can respond as soon as the discovery channel is idle.

In an embodiment, determining, by the first electronic device, collision of at least one of discovery beacon, connection request, connection confirmation and connection setup messages sent by the first electronic device with at least one of discover beacon, connection request, connection response and connection setup message of the at least one of second electronic device.

In an embodiment, the advertisement information contains information which are specific to the second electronic device to get responses from at least one relevant electronic device.

Accordingly, the embodiments herein disclose the first electronic device for collision avoidance in the Ultra-Wide Band (UWB) network, the first electronic device includes a memory, a processor and a collision avoidance controller coupled to the memory and the processor. The collision avoidance controller is configured to identify the slot in the mirroring channel for sending the advertisement packet. Further, the collision avoidance controller is configured to start a Reservation Delay Timer (RDT) before reserving the identified slot in the mirroring channel and determine whether at least one second electronic device in the UWB network is trying to reserve the identified slot in the mirroring channel while the RDT timer is running. Further, the collision avoidance controller is configured to reserve the identified slot in the mirroring channel in response to determining that the at least one second electronic device is not trying to reserve the identified slot while the RDT timer is running, and send the advertisement packet for the reservation at expiry of the RDT, or back off from reserving the identified slot in the mirroring channel for collision avoidance in response to determining that the at least one second electronic device is trying to reserve the identified slot while the RDT timer is running.

Accordingly, the embodiments herein disclose a first electronic device for collision avoidance in a discovery channel in an Ultra-Wide Band (UWB) network, the first electronic device includes a memory, a processor and a collision avoidance controller coupled to the memory and the processor. The collision avoidance controller is configured to define at least one of: Ranging Discovery Initial Delay (RDID) timer, Ranging Discovery Response Delay (RDRD) timer and Ranging Connection Setup Delay (RCSD) timer and start the at least one of the RDID timer, RDRD timer and RCSD timer. The collision avoidance controller is further configured to determine presence of collision in a discovery channel. The collision avoidance controller is further configured to send at least one of discovery beacon, connection request, connection confirmation and connection setup messages in the discovery channel if no collision is detected before the expiry of the timer or back off from sending at least one of discovery beacon, connection request, connection confirmation and connection setup messages in the discovery channel in response to determining the presence of collision in the discovery channel.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This invention is illustrated in the accompanying drawings, throughout which like reference letters indicate corresponding parts in the various figures. The embodiments herein will be better understood from the following description with reference to the drawings, in which.

MODE FOR THE INVENTION

Figure 1:
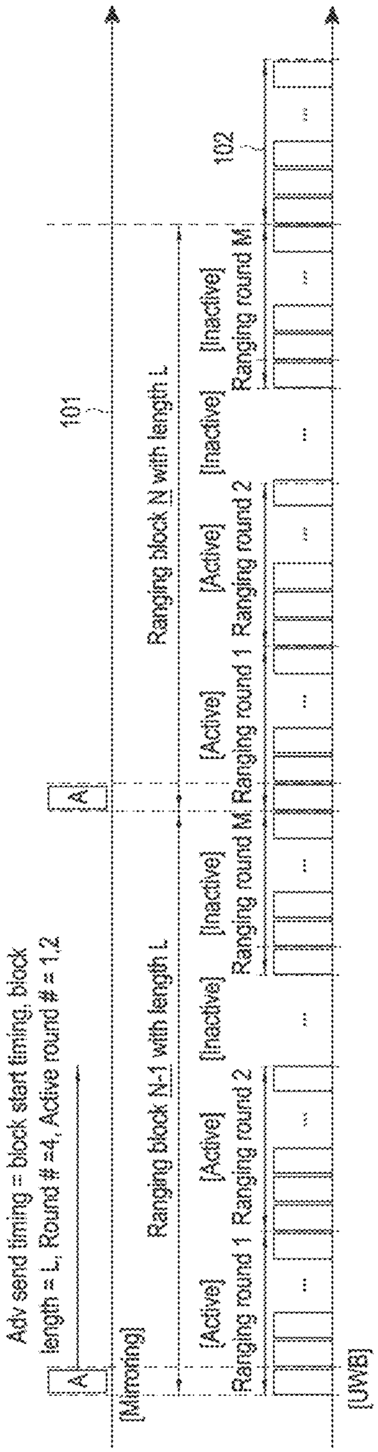
FIG. 1 is a schematic diagram illustrating a mirroring channel, according to a prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be constructed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Accordingly, the embodiments herein disclose a method for collision avoidance in an Ultra-Wide Band (UWB) network. The method further includes identifying in the UWB network, a slot in a mirroring channel for sending an advertisement packet and starting a Reservation Delay Timer (RDT) before reserving the identified slot in the mirroring channel. The method further includes determining whether at least one second electronic device in the UWB network is trying to reserve the identified slot in the mirroring channel while the RDT timer is running. The method further includes performing reserving the identified slot in the mirroring channel in response to determining that the at least one second electronic device is not trying to reserve the identified slot while the RDT timer is running, and sending the advertisement packet for the reservation at expiry of the RDT or backing off from reserving the identified slot in the mirroring channel for collision avoidance in response to determining that the at least one second electronic device is trying to reserve the identified slot while the RDT timer is running.

Accordingly, the embodiments herein disclose a first electronic device for collision avoidance in a discovery channel in an Ultra-Wide Band (UWB) network, the first electronic device includes a memory, a processor and a collision avoidance controller coupled to the memory and the processor. The collision avoidance controller is configured to define at least one of: Ranging Discovery Initial Delay (RDID) timer, Ranging Discovery Response Delay (RDRD) timer and Ranging Connection Setup Delay (RCSD) timer and start the at least one of the RDID timer, RDRD timer and RCSD timer. The collision avoidance controller is further configured to determine presence of collision in a discovery channel. The collision avoidance controller is further configured to send at least one of discovery beacon, connection request, connection confirmation and connection setup messages in the discovery channel if no collision is detected before the expiry of the timer or back off from sending at least one of discovery beacon, connection request, connection confirmation and connection setup messages in the discovery channel in response to determining the presence of collision in the discovery channel.

FIG. 1 is a schematic diagram illustrating a mirroring channel, according to a prior art.

The mirroring channel (101) reflects the behavior of Ultra-Wide Band (UWB) channel(s) (102). In the mirroring channel (101), an advertisement packet is sent by the electronic device which occupies UWB channel (102) at the same time. By listening to the mirroring channel (101) and receiving the advertisement packet, other electronic devices can recognize whether the corresponding UWB channel (102) is occupied or not. After a discovery procedure in a discovery channel, controller shall listen to mirroring channel (101) to find the available time in UWB channel (102) and reserves a free slot from next cycle by sending advertisement packet.

Referring to FIG. 1, the electronic device transmits a packet at every active ranging round. The packet is used for energy detection to represent the existence of UWB communication. The packet includes the occupation information of the UWB channel (102) including start time of ranging rounds, channel occupation time of controller's session, length of Ranging Block, length of ranging round, number of Active Round or index of active round.

Further the packet also includes information related to configurations of session of electronic device, Physical (PHY) configuration, Synchronous Transport Signal (STS) index. The electronic device scans the mirroring channel (101) before starting its new session to avoid collision. However in the conventional system of mirroring channel usage, collision is possible when two electronic devices identify and reserves same free slot.

Figure 2:
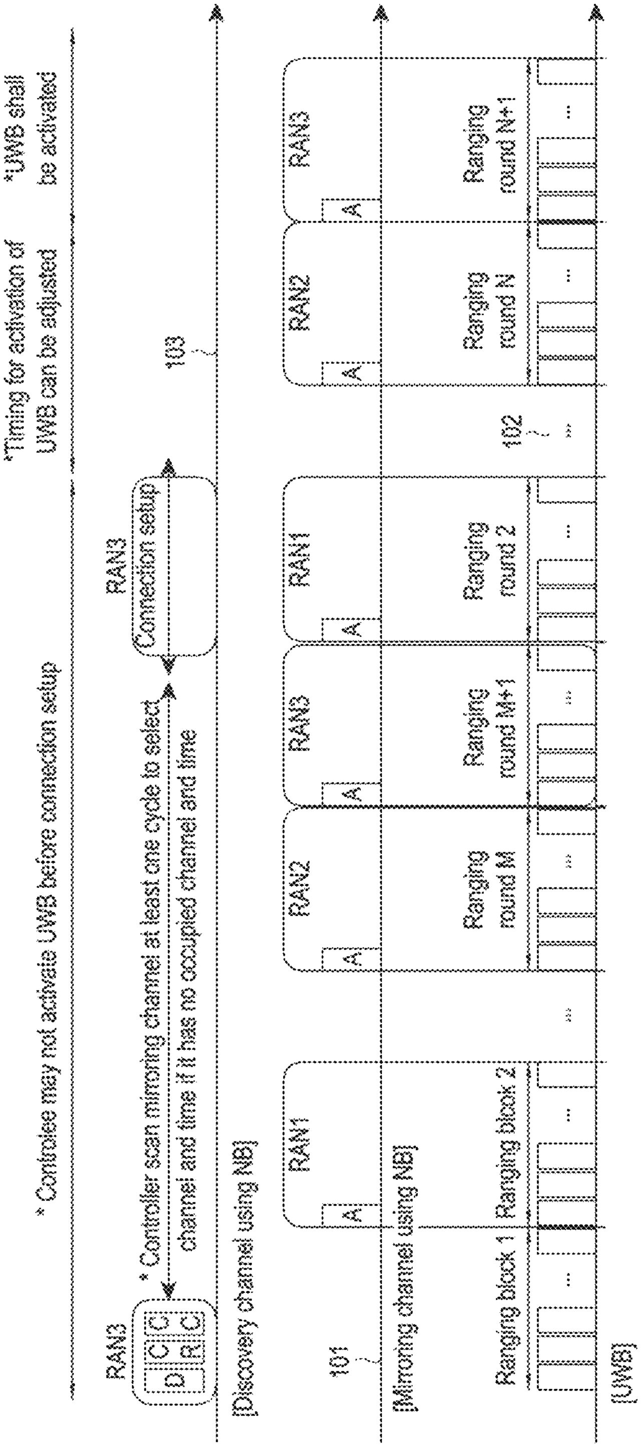
FIG. 2 is a schematic diagram illustrating a discovery channel, according to a prior art.

FIG. 2 is a schematic diagram illustrating a discovery channel, according to a prior art.

The electronic device sends discovery beacon in the discovery channel (103). The discovery beacon can be treated same as the packets for device discovery in other wireless communication technologies such as advertisement in Bluetooth Low Energy (BLE). After finding available UWB channel (102) and time by listening to the mirroring channel (101), the electronic device exchanges the messages for connection setup in the discovery channel (103).

The electronic device transmits a packet at discovery channel (103) to discover UWB Devices. When electronic devices receives a packet at the discovery channel (103), additional packets are exchanged to establish the UWB communication between them, also mirroring channel (101) can be used for to establish the UWB communication between them. The energy consumption is lowered by using Narrow Band (NB) discovery channel in the UWB communication. The NB discovery channel replaces BLE.

However in the conventional system of discovery channel usage, collision is possible when two discovery messages collide, two connection setup messages collide, or discovery and connection setup messages collide.

Figure 3:
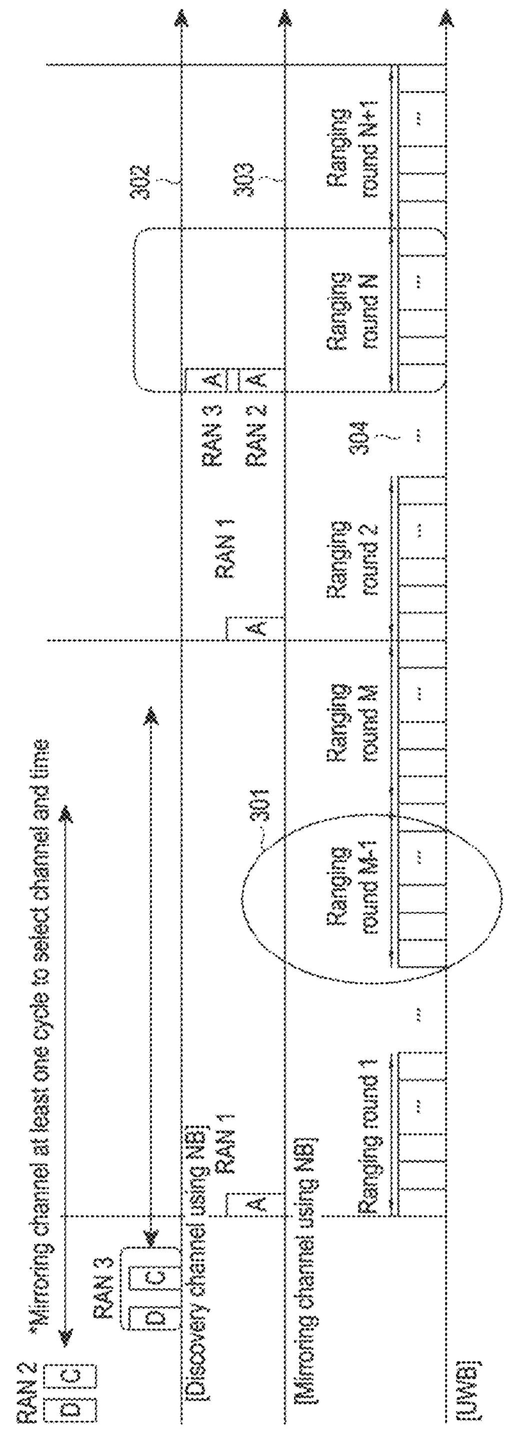
FIG. 3 is a schematic diagram illustrating collision possibilities in the mirroring channel, according to a prior art.

FIG. 3 is a schematic diagram illustrating collision possibilities in the mirroring channel, according to a prior art.

The collision possibilities in the mirroring channel (302) is by assuming one mirror channel per UWB channel (304). Here collision occurs when two electronic devices sends such as radio access network (RAN) that is RAN 2 and RAN 3 scans and send Advertisement packet (A) over same UWB channel and want to reserve the same slot (301).

Figure 4:
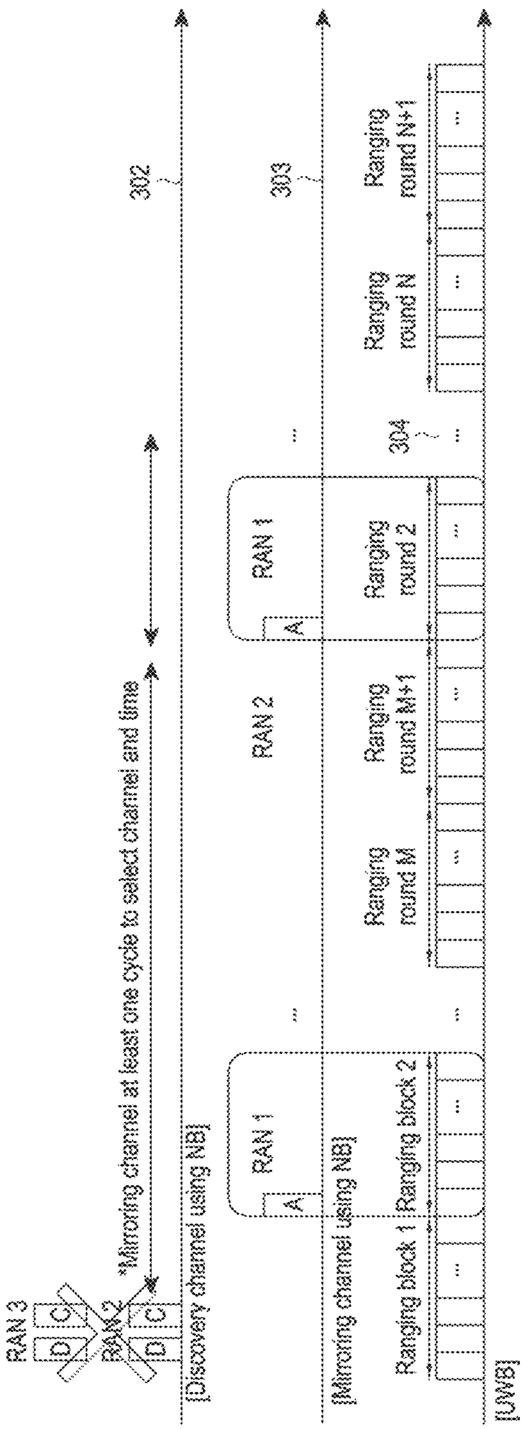
FIG. 4 is a schematic diagram illustrating collision possibilities in the discovery channel during discovery, connection request and connection confirmation, according to a prior art.

FIG. 4 is a schematic diagram illustrating collision possibilities in the discovery channel during discovery, connection request and connection confirmation, according to a prior art.

Figure 5:
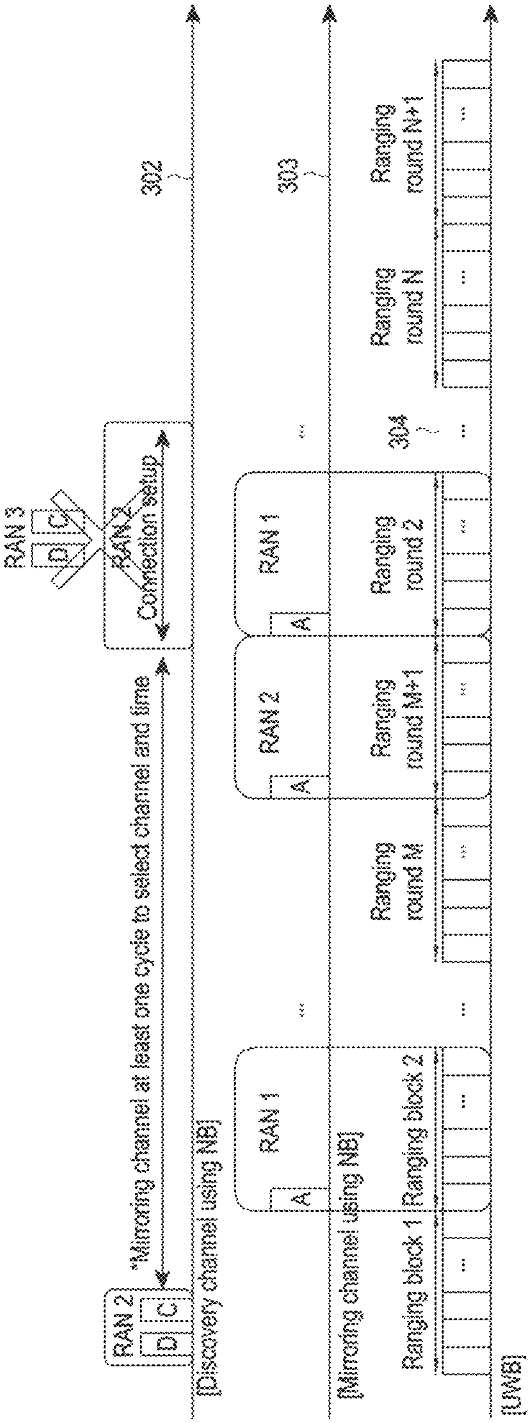
FIG. 5 is a schematic diagram illustrating collision possibilities in the discovery channel during connection setup, according to a prior art.

The collision possibilities in the mirroring channel (302) occurs if the device discovery beacon (D), connection request (CR) and connection confirmation (CC) messages transmit over same channel and when multiple devices such as RAN 2 and RAN 3 overlap in sending D, CR and CC messages. In FIG. 4 the alphabet C denotes the combination of CR and CC messages FIG. 5 is a schematic diagram illustrating collision possibilities in the discovery channel during connection setup, according to a prior art.

The collision possibilities in the discovery channel (303) occurs when sharing of connection setup messages over same channel. Here collision occurs when multiple devices such as RAN 2 and RAN 3 overlap in sending connection setup messages. In FIG. 5 the alphabet C denotes the combination of CR and CC messages.

Referring now to the drawings and more particularly to FIGS. 6 through 10, where similar reference characters denote corresponding features consistently throughout the figure, these are shown preferred embodiments.

Figure 6:
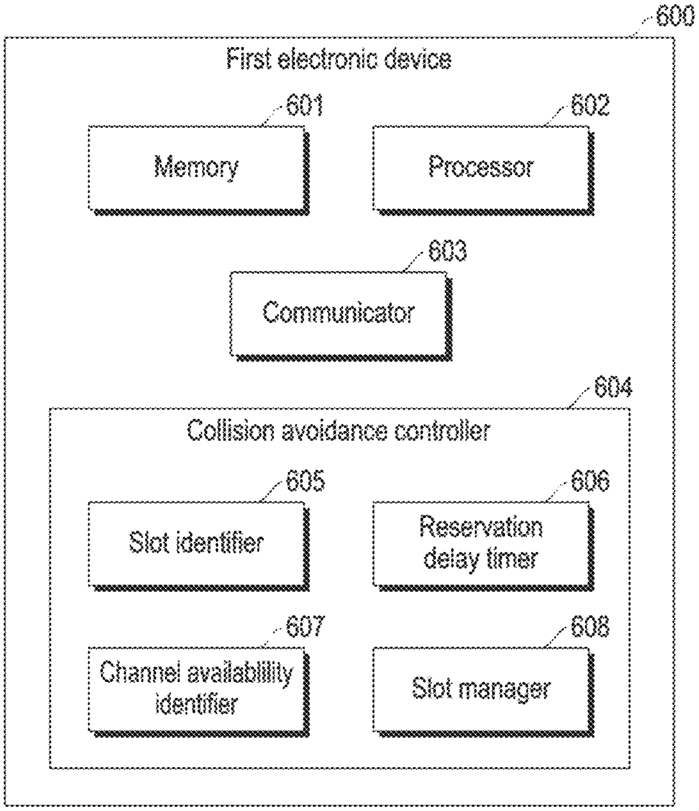
FIG. 6 is a block diagram of an first electronic device for collision avoidance in an ultra-wide band network, according to the embodiments as disclosed herein.

FIG. 6 is a block diagram of a first electronic device for collision avoidance in an Ultra-Wide Band (UWB) network, according to the embodiments as disclosed herein.

Referring to FIG. 6, examples of the first electronic device (600) include, but are not limited to a laptop, a palmtop, a desktop, a mobile phone, a smartphone, Personal Digital Assistant (PDA), a tablet, a wearable device, an Internet of Things (IoT) device, a virtual reality device, a foldable device, a flexible device, an immersive system, etc.

In an embodiment, the first electronic device (600) includes a memory (601), a processor (602), a communicator (603), and a collision avoidance controller (604).

The memory (601) stores instructions to be executed by the processor (602). The memory (601) may include non-volatile storage elements. Examples of such nonvolatile storage elements may include magnetic hard discs, optical discs, floppy discs, flash memories, or forms of electrically programmable memories (EPROM) or electrically erasable and programmable (EEPROM) memories. In addition, the memory (601) may, in some examples, be considered a non-transitory storage medium. The term "non-transitory" may indicate that the storage medium is not embodied in a carrier wave or a propagated signal. However, the term "non-transitory" should not be interpreted that the memory (601) is non-movable. In some examples, the memory (601) can be configured to store larger amounts of information than its storage space. In certain examples, a non-transitory storage medium may store data that can, over time, change (e.g., in Random Access Memory (RAM) or cache). The memory (601) can be an internal storage unit or it can be an external storage unit of the first electronic device (600), a cloud storage, or any other type of external storage.

The processor (602) is configured to execute instructions stored in the memory (601). The processor (602) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (602) may include multiple cores to execute the instructions.

The communicator (603) is configured for communicating internally between hardware components in other user equipment or server. Further, the communicator (603) is configured to facilitate the communication between the electronic device (600) and other devices via one or more networks (e.g. Radio technology). The communicator (603) includes an electronic circuit specific to a standard that enables wired or wireless communication.

The collision avoidance controller (604) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The collision avoidance controller (604) includes a slot identifier (605), a reservation delay timer (606), a channel availability identifier (607) and slot manager (608).

The slot identifier is configured to identify a slot in a mirroring channel (101) for sending an advertisement packet and start a Reservation Delay Timer (RDT) (606) before reserving the identified slot in the mirroring channel (101). The channel availability identifier (607) is determines whether at least one second electronic device in the UWB network is trying to reserve the identified slot in the mirroring channel (101) while the RDT (606) timer is running. The slot manager (608) reserves the identified slot in the mirroring channel (101) in response to determining that the at least one second electronic device is not trying to reserve the identified slot while the RDT timer is running, and send the advertisement packet for the reservation at expiry of the RDT (606) or back off from reserving the identified slot in the mirroring channel (101) for collision avoidance in response to determining that the at least one second electronic device is trying to reserve the identified slot while the RDT (606) is running.

In an embodiment, the collision avoidance controller (604) is configured to send the advertisement packet at a beginning of a reservation window from next cycle of the reservation.

In an embodiment, the collision avoidance controller (604) is configured to initiate the reservation window based on the identified slot and start the RDT at beginning of the reservation window.

In an embodiment, the RDT (606) comprises of a value in between at least one of a minimum value of at least one Round Trip Time (RTT) and a maximum value of a difference between a window size of the reservation window and a time duration of the advertisement packet.

In an embodiment, the collision avoidance controller (604) is configured to receive the advertisement packet in the mirroring channel (101) from the at least one second electronic device and extract an advertisement information in the advertisement packet. The collision avoidance controller (604) is further configured to identify a schedule of transmission of the second electronic device from the advertisement information and transmit advertisement packet based on the identified schedule of the second electronic device.

In an embodiment, the collision avoidance controller (604) is configured to add an advertisement information in the advertisement packet, wherein advertisement information have a schedule of transmission of the first electronic device (600) and send the advertisement packet in the mirroring channel.

The collision avoidance controller (604) is configured to define at least one of: Ranging Discovery Initial Delay (RDID) timer, Ranging Discovery Response Delay (RDRD) timer and Ranging Connection Setup Delay (RCSD) timer. The collision avoidance controller (604) is further configured to start the at least one of the RDID timer, RDRD timer and RCSD timer and determine presence of collision in a discovery channel. The collision avoidance controller (604) is further configured to send at least one of discovery beacon, connection request, connection confirmation and connection setup messages in the discovery channel (103) if no collision is detected before the expiry of the timer or back off from sending at least one of discovery beacon, connection request, connection confirmation and connection setup messages in the discovery channel (103) in response to determining the presence of collision in the discovery channel (103).

In an embodiment, value of the RCSD timer is higher than the RDRD timer and lower than the RDID timer.

In an embodiment, the collision avoidance controller (604) is configured to determine presence of collision in a discovery channel (103). The collision avoidance controller (604) is further configured to back off in linear in response to the detection of less collisions or back off in exponential in response to the detection of more collisions.

In an embodiment, the collision avoidance controller (604) is configured to send the connection setup messages during a connection setup in the discovery channel (103) in response to expiry of the RCSD timer; wherein next messages within connection setup can respond as soon as the discovery channel (103) is idle.

In an embodiment, the collision avoidance controller (604) is configured to determine collision of at least one of discovery beacon, connection request, connection confirmation and connection setup messages sent by the first electronic device (600) with at least one of discover beacon, connection request, connection response and connection setup message of the at least one of second electronic device.

In an embodiment, the advertisement information contains information which are specific to the second electronic device to get responses from at least one relevant electronic device.

Figure 7A:
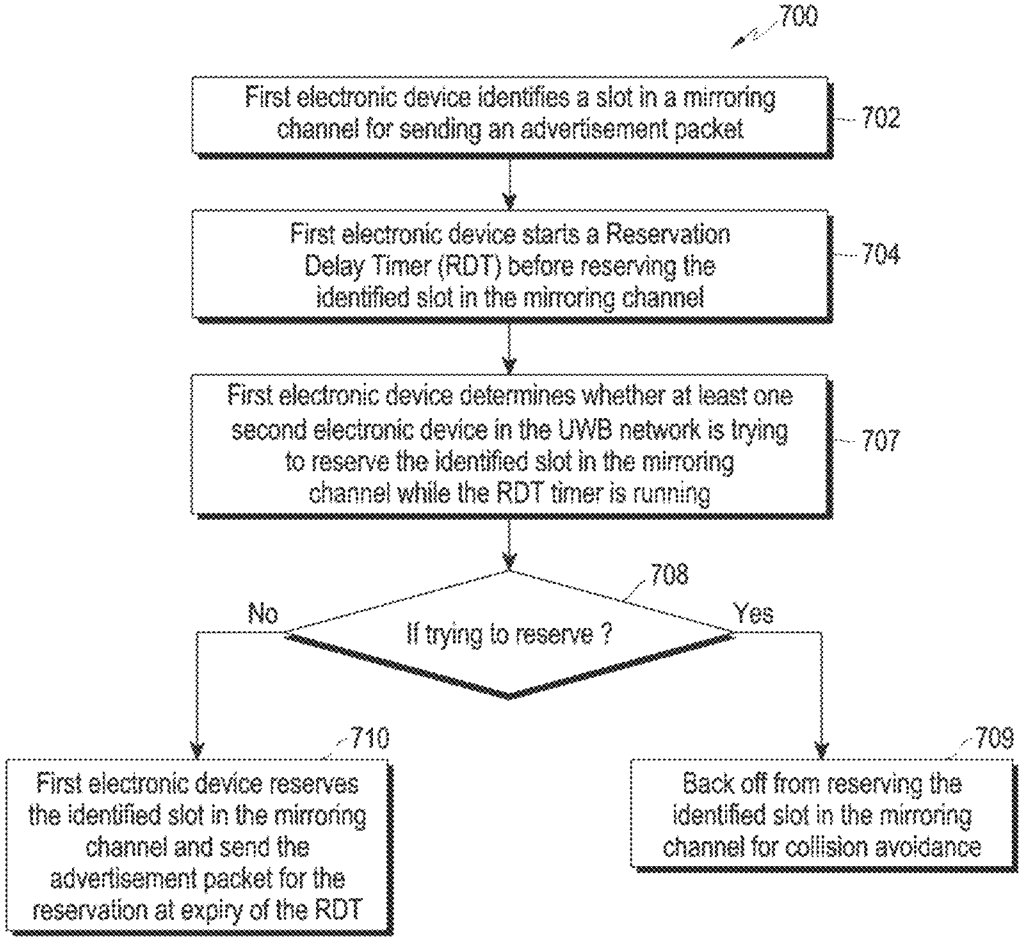
FIG. 7A is a flow diagram illustrating a method for collision avoidance in an UltraWide Band (UWB) network by reserving a slot in the mirroring channel, according to the embodiments as disclosed herein.

FIG. 7A is a flow diagram illustrating a method for collision avoidance in an UltraWide Band (UWB) network by reserving a slot in the mirroring channel, according to the embodiments as disclosed herein.

In the flow chart (700), at step 702, the first electronic device (600) identifies a slot in a mirroring channel for sending an advertisement packet.

At step 704, the first electronic device (600) starts a Reservation Delay Timer (RDT) before reserving the identified slot in the mirroring channel.

At step 707, the first electronic device (600) determines whether at least one second electronic device in the UWB network is trying to reserve the identified slot in the mirroring channel while the RDT timer is running.

At step 708, the first electronic device (600) determines if trying to reserve.

At step 710, the first electronic device (600) reserves the identified slot in the mirroring channel and send the advertisement packet for the reservation at expiry of the RDT in response to determining at least one second electronic device in the UWB network is not trying to reserve the identified slot in the mirroring channel At step 709, the first electronic device (600) backs off from reserving the identified slot in the mirroring channel for collision avoidance in response to determining at least one second electronic device in the UWB network is trying to reserve the identified slot in the mirroring channel.

Figure 7B:
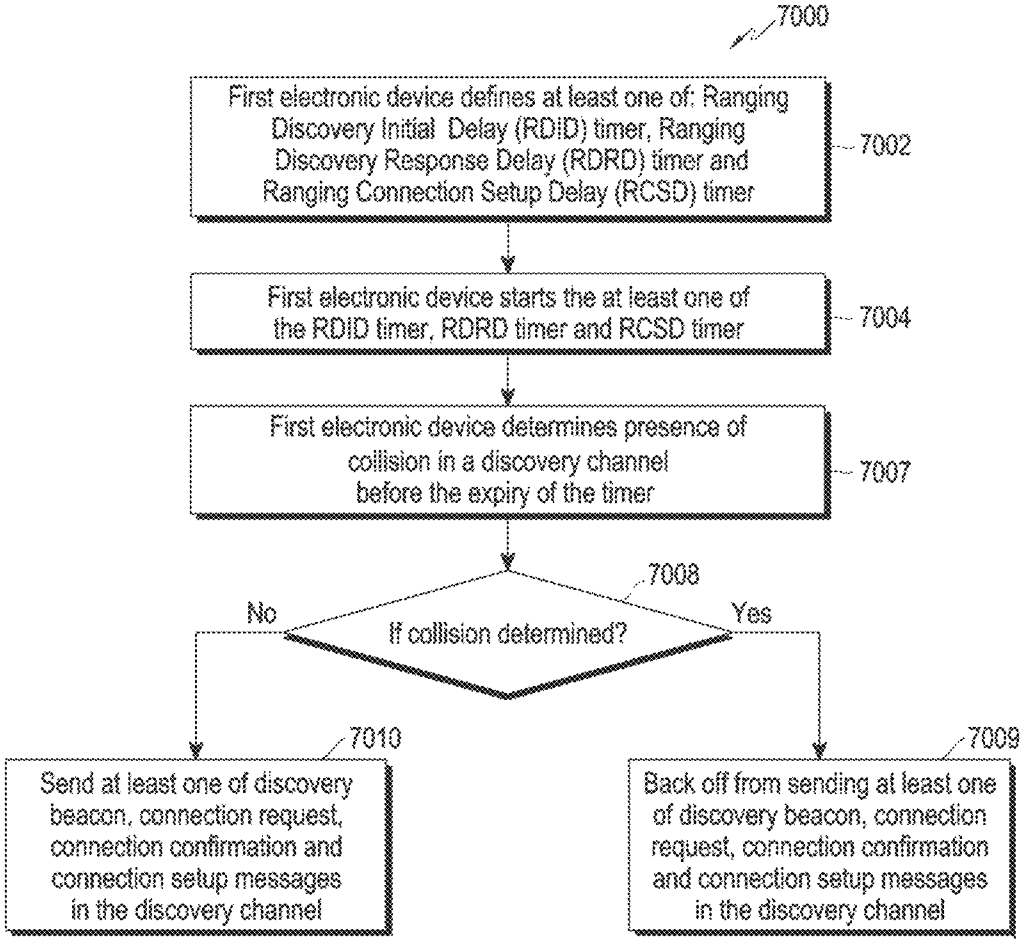
FIG. 7B is a flow diagram illustrating a method for collision avoidance in a discovery channel (103) in an Ultra-Wide Band (UWB) network, according to the embodiments as disclosed herein.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention FIG. 7B is a flow diagram illustrating a method for collision avoidance in a discovery channel (103) in an Ultra-Wide Band (UWB) network, according to the embodiments as disclosed herein.

In the flow chart (7000), at step 7002, the first electronic device (600) defines at least one of: Ranging Discovery Initial Delay (RDID) timer, Ranging Discovery Response Delay (RDRD) timer and Ranging Connection Setup Delay (RCSD) timer.

At step 7004, the first electronic device (600) starts the at least one of the RDID timer, RDRD timer and RCSD timer.

At step 7007, the first electronic device (600) determines presence of collision in a discovery channel before the expiry of the timer.

At step 7008, the first electronic device (600) determines whether collision determined in the discovery channel.

At step 7010, the first electronic device (600) sends at least one of discovery beacon, connection request, connection confirmation and connection setup messages in the discovery channel.

At step 7009, the first electronic device (600) back off from sending at least one of discovery beacon, connection request, connection confirmation and connection setup messages in the discovery channel.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention FIG. 8 is a schematic diagram illustrating a mirroring channel, according to the embodiments as disclosed herein.

Figure 8:
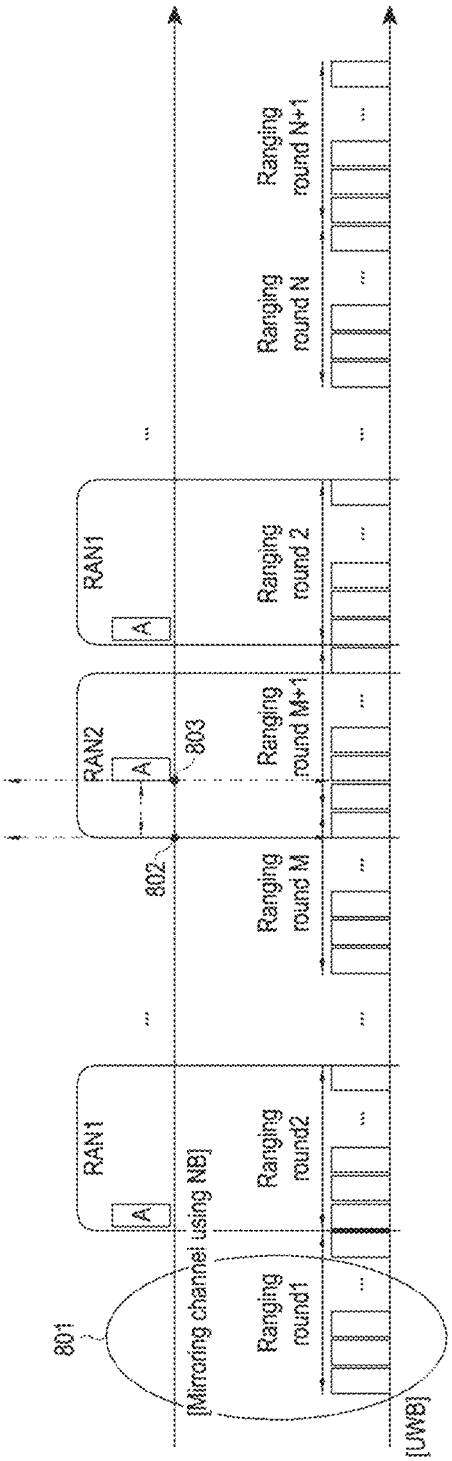
FIG. 8 is a schematic diagram illustrating a mirroring channel, according to the embodiments as disclosed herein.

Referring to FIG. 8, identifying in the UWB network, a slot in a mirroring channel (101) for sending an advertisement packet and starting a Reservation Delay Timer (RDT) before reserving the identified slot in the mirroring channel (101). The method further includes determining whether at least one second electronic device in the UWB network is trying to reserve the identified slot in the mirroring channel (101) while the RDT timer is running. The method further includes performing reserving the identified slot in the mirroring channel (101) in response to determining that the at least one second electronic device is not trying to reserve the identified slot while the RDT timer is running, and sending the advertisement packet for the reservation at expiry of the RDT.

There are chances of two electronic devices choosing same time slot to be reserved, thus collision avoidance in mirroring channel is necessary during reserving of open slots. Referring to FIG. 8, the proposed system defines a random delay timer that is Reservation Delay Timer (RDT) to expire (803) before the electronic device starts advertising (A) for reserving free slot (801). The RDT starts at the beginning of reservation window (802). The RDT can have minimum value of at least one RTT and a max value of difference between reservation window size and time duration of advertisement packet. This ensures the advertisement is transmitted completely within the reservation window that the controller wishes to reserve.

In the proposed system, sending the advertisement packet at a beginning of a reservation window from next cycle of the reservation.

Figure 9:
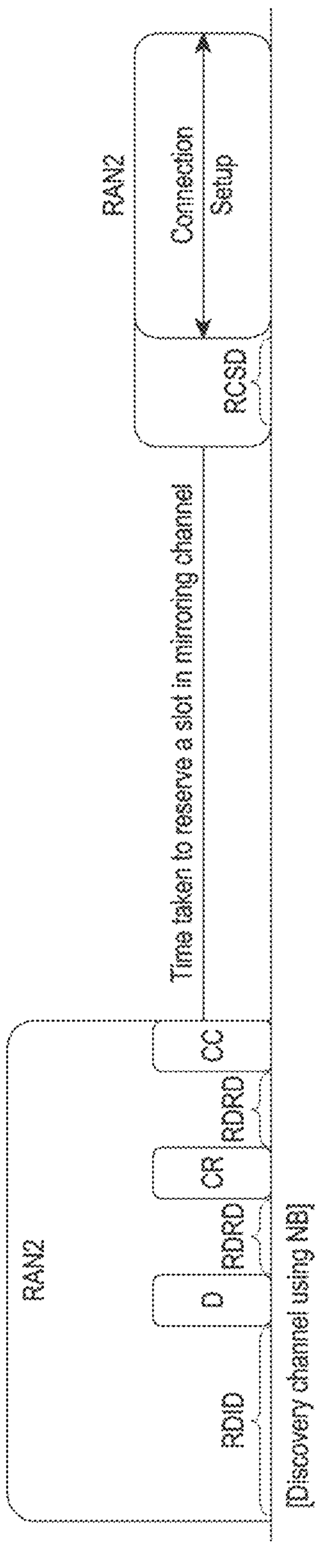
FIG. 9 is a schematic diagram illustrating a discovery channel, according to the embodiments as disclosed herein.

FIG. 9 is a schematic diagram illustrating a discovery channel, according to the embodiments as disclosed herein.

Referring to FIG. 9, to address collision due to D, CR and CC messages, the proposed system define two delay timers such as Ranging Discovery Initial Delay (RDID), Ranging Discovery Response Delay (RDRD), wherein connection request and connection confirmation response has higher priority than a new discovery beacon.

To address collision due to connection setup message, the proposed system defines a Ranging Connection Setup Delay (RCSD) timer. The first connection setup message has to wait for RCSD period of idle channel before transmitting. Next set of messages within connection setup is not required to wait and can respond as soon as the channel is found to be idle.

The connection setup message is given higher priority than device discovery message, the priority order is RDID>RCSD>RDRD.

Figure 10:
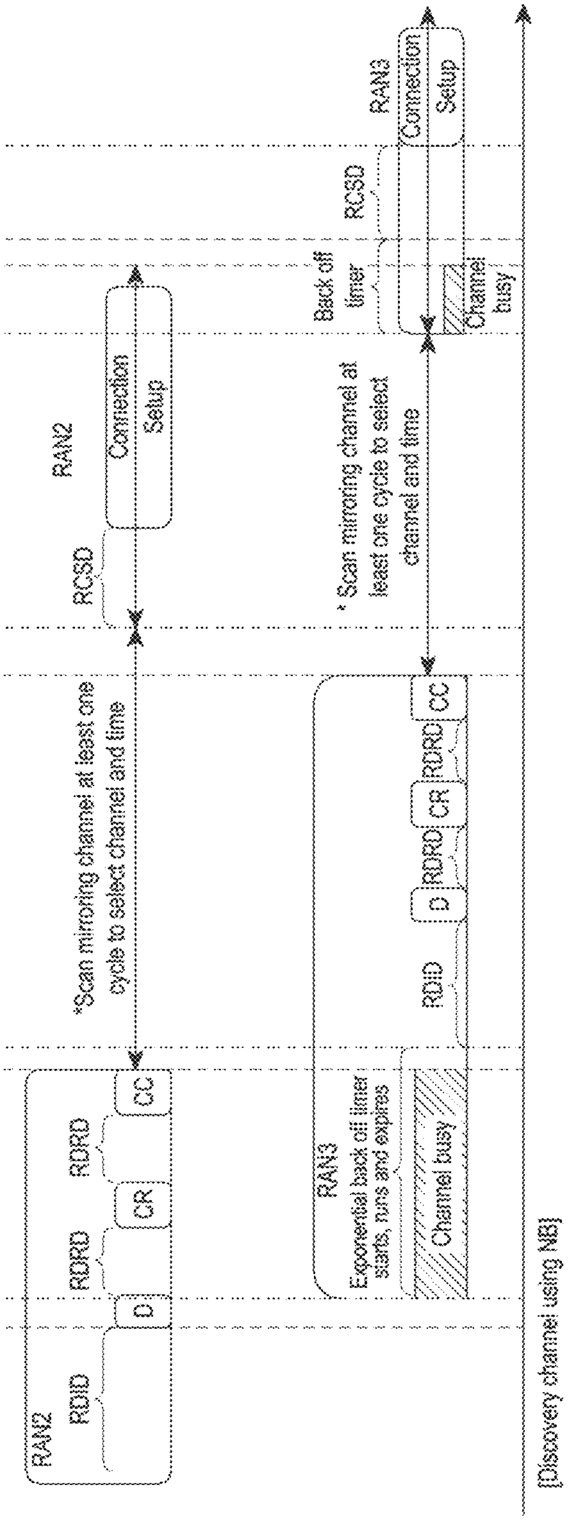
FIG. 10 is a schematic diagram illustrating a discovery channel when the channel is not available immediately, according to the embodiments as disclosed herein.

FIG. 10 is a schematic diagram illustrating a discovery channel when the channel is not available immediately, according to the embodiments as disclosed herein.

Referring to FIG. 10, determining by the electronic device presence of collision in the discovery channel. If there is no collision, starting the at least one of RDID timer, RDRD timer and RCSD timer before sending at least one of D, CR and CC and connection setup messages in the discovery channel.

The electronic device backing off from starting of the at least one of RDID timer, RDRD timer and RCSD timer for collision avoidance in response to determining the presence of collision in the discovery channel.

The proposed system introduces dynamic back off strategy such as linear and exponential. Wherein the back off is linear if collisions are rare and the back off is exponential if collisions are more.

Figure 11:
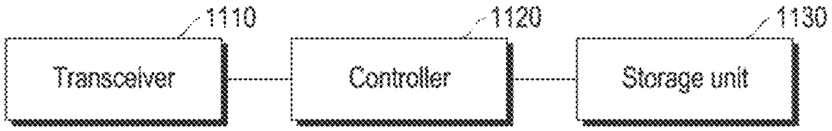
FIG. 11 illustrates an electronic device according to an embodiment.

FIG. 11 illustrates an electronic device according to an embodiment. For example, the electronic device may be a first electronic device or a second electronic device.

Referring to FIG. 11, the electronic device includes a transceiver 1110, a controller 1120, and a storage unit 1130. The controller 1120 may be defined as a circuit, an ASIC, and/or at least one processor.

The transceiver 1110 may transmit and receive signals to/from another entity.

The controller 1120 may control the overall operation of the electronic device according to an embodiment. The controller 1120 may control inter-block signal flow to perform the operations according to the above-described flowchart. Specifically, the controller 1120 may control the operations (e.g., the operations of the application and/or framework) of the electronic device described above with reference to FIGS. 1 to 10. The controller 1120 may include the collision avoidance controller as shown in the FIG. 6.

The storage unit 1130 may store at least one of information transmitted/received via the transceiver 1110 and information generated via the controller 1120. For example, the storage unit 1130 may store information and data necessary for the method described above with reference to FIGS. 1 to 10. The storage unit 1130 may include a memory device.

The first electronic device (or, the controller of the first electronic device) may be configured to identify a slot in a mirroring channel for sending an advertisement packet.

The first electronic device (or, the controller of the first electronic device) may be configured to start a Reservation Delay Timer (RDT) before reserving the identified slot in the mirroring channel.

The first electronic device (or, the controller of the first electronic device) may be configured to determine whether at least one second electronic device in the UWB network is trying to reserve the identified slot in the mirroring channel while the RDT timer is running.

The first electronic device (or, the controller of the first electronic device) may be configured to reserve the identified slot in the mirroring channel in response to determining that the at least one second electronic device is not trying to reserve the identified slot while the RDT timer is running, and send the advertisement packet for the reservation at expiry of the RDT.

The first electronic device (or, the controller of the first electronic device) may be configured to back off from reserving the identified slot in the mirroring channel for collision avoidance in response to determining that the at least one second electronic device is trying to reserve the identified slot while the RDT timer is running.

The first electronic device (or, the controller of the first electronic device) may be configured to send the advertisement packet at a beginning of a reservation window from next cycle of the reservation.

The first electronic device (or, the controller of the first electronic device) may be configured to initiate the reservation window based on the identified slot, and start the RDT at beginning of the reservation window.

The RDT may comprise of a value in between at least one of a minimum value of at least one Round Trip Time (RTT) and a maximum value of a difference between a window size of the reservation window and a time duration of the advertisement packet.

The first electronic device (or, the controller of the first electronic device) may be configured to receive the advertisement packet in the mirroring channel from the at least one second electronic device, extract an advertisement information in the advertisement packet, identify a schedule of transmission of the second electronic device from the advertisement information, transmit an advertisement packet based on the identified schedule of the second electronic device.

The first electronic device (or, the controller of the first electronic device) may be configured to add an advertisement information in the advertisement packet, wherein advertisement information have a schedule of transmission of the first electronic device, and send the advertisement packet in the mirroring channel.

The advertisement information may comprise information which are specific to the second electronic device to get responses from at least one relevant electronic device.

The first electronic device (or, the controller of the first electronic device) may be configured to start at least one of: Ranging Discovery Initial Delay (RDID) timer, Ranging Discovery Response Delay (RDRD) timer and Ranging Connection Setup Delay (RCSD) timer.

The first electronic device (or, the controller of the first electronic device) may be configured to determine presence of collision in a discovery channel.

The first electronic device (or, the controller of the first electronic device) may be configured to send at least one of discovery beacon, connection request, connection confirmation and connection setup messages in the discovery channel if no collision is detected before the expiry of the timer.

The first electronic device (or, the controller of the first electronic device) may be configured to back off from sending at least one of discovery beacon, connection request, connection confirmation and connection setup messages in the discovery channel in response to determining the presence of collision in the discovery channel.

A value of the RCSD timer may be higher than the RDRD timer and lower than the RDID timer.

The first electronic device (or, the controller of the first electronic device) may be configured to determine presence of collision in a discovery channel, back off in linear in response to the detection of less collisions, and back off in exponential in response to the detection of more collisions.

The first electronic device (or, the controller of the first electronic device) may be configured to send the connection setup messages during a connection setup in the discovery channel in response to expiry of the RCSD timer; wherein next messages within connection setup can respond as soon as the discovery channel is idle.

The first electronic device (or, the controller of the first electronic device) may be configured to determine collision of at least one of discovery beacon, connection request, connection confirmation and connection setup messages sent by the first electronic device with at least one of discover beacon, connection request, connection response and connection setup message of the at least one of second electronic device.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

The invention claimed is:

1. A method performed by a first electronic device for collision avoidance in an ultra-wide band (UWB) network, the method comprising:

identifying a slot in a mirroring channel for transmitting an advertisement packet for a reservation in the UWB network;

initiating a reservation delay timer (RDT) before reserving the identified slot in the mirroring channel;

determining whether at least one second electronic device in the UWB network is trying to reserve the identified slot in the mirroring channel while the RDT is running;

reserving the identified slot in the mirroring channel, in response to determining that the at least one second electronic device is not trying to reserve the identified slot while the RDT is running, and transmitting the advertisement packet for the reservation at expiry of the RDT; and backing off from reserving the identified slot in the mirroring channel for collision avoidance, in response to determining that the at least one second electronic device is trying to reserve the identified slot while the RDT is running.

2. The method of claim 1, further comprising transmitting the advertisement packet at a beginning of a reservation window from a next cycle of the reservation.

3. The method of claim 1, wherein initiating the RDT comprises:

initiating a reservation window based on the identified slot; and initiating the RDT at a beginning of the reservation window.

4. The method of claim 1, wherein the RDT includes a value between a minimum value of at least one round trip time (RTT) and a maximum value of a difference between a window size of a reservation window and a time duration of the advertisement packet.

5. The method of claim 1, further comprising:

receiving, from the at least one second electronic device, the advertisement packet in the mirroring channel;

extracting advertisement information from the advertisement packet;

identifying a transmission schedule of the at least one second electronic device from the advertisement information; and transmitting the advertisement packet based on the identified transmission schedule of the at least one second electronic device.

6. The method of claim 1, further comprising:

adding advertisement information in the advertisement packet, wherein the advertisement information includes a transmission schedule of the first electronic device; and transmitting the advertisement packet in the mirroring channel.

7. The method of claim 6, wherein the advertisement information includes information that is specific to a specific electronic device among the at least one second electronic device, to get a response from the specific electronic device.

8. A first electronic device for collision avoidance in an ultra-wide band (UWB) network, the first electronic device comprising:

a transceiver; and a controller coupled to the transceiver, and configured to:

identify a slot in a mirroring channel for transmitting an advertisement packet for a reservation in the UWB network, initiate a reservation delay timer (RDT) before reserving the identified slot in the mirroring channel, determine whether at least one second electronic device in the UWB network is trying to reserve the identified slot in the mirroring channel while the RDT is running, reserve the identified slot in the mirroring channel, in response to determining that the at least one second electronic device is not trying to reserve the identified slot while the RDT is running, and transmit the advertisement packet for the reservation at expiry of the RDT, and back off from reserving the identified slot in the mirroring channel for collision avoidance in response to determining that the at least one second electronic device is trying to reserve the identified slot while the RDT is running.

9. The first electronic device of claim 8, wherein the controller is further configured to transmit the advertisement packet at a beginning of a reservation window from a next cycle of the reservation.

10. The first electronic device of claim 8, wherein the controller is further configured to:

initiate a reservation window based on the identified slot, and initiate the RDT at a beginning of the reservation window, and wherein the RDT includes a value between a minimum value of at least one round trip time (RTT) and a maximum value of a difference between a window size of the reservation window and a time duration of the advertisement packet.

11. The first electronic device of claim 8, wherein the controller is further configured to:

receive, from the at least one second electronic device, the advertisement packet in the mirroring channel, extract advertisement information in the advertisement packet, identify a transmission schedule of the at least one second electronic device from the advertisement information, and transmit the advertisement packet based on the identified transmission schedule of the at least one second electronic device.

12. The first electronic device of claim 8, wherein the controller is further configured to:

add advertisement information in the advertisement packet, wherein the advertisement information includes a transmission schedule of the first electronic device, and transmit the advertisement packet in the mirroring channel, wherein the advertisement information includes information that is specific to a specific electronic device among the at least one second electronic device, to get a response from the specific electronic device.

* * * * *